United States Patent [19]

Hashimoto et al.

[11] 4,174,230
[45] Nov. 13, 1979

[54] GYPSUM COMPOSITIONS

[75] Inventors: Mitsuo Hashimoto, Ichihara; Toshiyuki Takyu, Sodegaura; Masaru Inoue, Sodegaura; Masami Takasaki, Sodegaura; Shinho Shiho, Sodegaura, all of Japan

[73] Assignee: Idemitsu Kosan Company Limited, Tokyo, Japan

[21] Appl. No.: 877,870

[22] Filed: Feb. 15, 1978

[30] Foreign Application Priority Data

Apr. 16, 1977 [JP] Japan ................................ 52/43712

[51] Int. Cl.$^2$ .............................................. C04B 11/09
[52] U.S. Cl. ................................... 106/109; 106/110; 106/111; 106/115; 106/116
[58] Field of Search ................................ 106/109–111, 106/115, 116, 112, 113; 423/555

[56] References Cited

U.S. PATENT DOCUMENTS

| | | | |
|---|---|---|---|
| 2,909,223 | 10/1959 | Kaveler | 106/115 |
| 3,153,596 | 10/1964 | Tallentire et al. | 106/115 |
| 3,895,018 | 7/1975 | Adolf | 106/116 |

*Primary Examiner*—James Poer
*Attorney, Agent, or Firm*—Frishauf, Holtz, Goodman & Woodward

[57] ABSTRACT

A gypsum composition comprising: (A) a lightweight spherical gypsum and (B) at least one binder selected from the group consisting of a water-soluble organic polymer, a water-dispersible organic polymer, a water-soluble inorganic compound, a water-dispersion medium colloid-forming inorganic compound, a water-hardenable compound and a mixture thereof. This gypsum composition provides a gypsum mold which is lightweight and, at the same time, has great mechanical strength.

13 Claims, No Drawings

400
GYPSUM COMPOSITIONS

BACKGROUND OF THE INVENTION

1. Field of the Invention

This invention relates to gypsum compositions and more particularly to gypsum compositions for use in the production of gypsum moldings which are lightweight and, at the same time, have great mechanical strength.

2. Description of the Prior Art

Various gypsum moldings such as gypsum boards, foamed gypsum moldings, etc., prepared by hardening a powdery gypsum, a columnar gypsum, a fibrous gypsum and the like with water or various binders have hitherto been known.

These conventional gypsum moldings, however, have the disadvantage in that the mechanical strength will decrease with a reduction in the weight and those moldings having a great mechanical strength are usually heavy.

Thus it has been desired to develop gypsum moldings which are lightweight and at the same time, have great mechanical strength.

SUMMARY OF THE INVENTION

The principal object of this invention is to provide gypsum compositions for use in the production of gypsum moldings which are lightweight and at the same time, have great mechanical strength.

It has been discovered that this object is attained by blending specific lightweight and spherical gypsums already developed by us, specific binders and if necessary, other additives.

Accordingly, this invention provides a gypsum composition comprising: (A) a lightweight spherical gympsum and (B) at least one binder selected from the group consisting of a water-soluble organic polymer, a water-dispersible organic polymer, a water-soluble inorganic compound, a water-dispersion medium colloid-forming inorganic compound, a water-hardenable compound and a mixture thereof.

DETAILED DESCRIPTION OF THE INVENTION

Lightweight spherical gypsums used in the gypsum compositions of this invention are usually composed of a great number of fibrous gypsums, and they are preferably in substantially spherical form wherein the diameter ranges between 10μ and 10 mm, and the bulk density ranges between 0.05 and 0.5 g/cm³. As for the type of gypsum, water-soluble type gypsums, such as α-type hemihydrate gypsum and III type anhydrous gypsum, or water-insoluble type gypsums, such as I, II type anhydrous gypsum can be used. They are in the form of "close-cropped head" or "aegagropila".

These lightweight spherical gypsums can be produced by a hydrothermal reaction of a β-type hemihydrate gypsum, a gypsum dihydrate, or a mixture thereof in, for example, an acid medium. In this hydrothermal reaction, the stirring rate and reaction period influence the shape and properties of the spherical gypsum obtained. It is, therefore, necessary to control the stirring so that no local turbulence be formed. The amount of gypsum used is less than ⅜ by weight, preferably less than ¼ by weight, based on the weight of the acid medium which will be hereinafter described. In this case, spherical gypsum mixed with fibrous gypsum some times may be obtained, but such gypsum can be used in the present invention.

Acid mediums which can be used in this procedure include organic acids such as formic acid, acetic acid, malic acid and the like, and inorganic acids such as phosphoric acid, hydrochloric acid, nitric acid, sulfuric acid and the like. These acid mediums are aqueous solutions containing 0.1 to 80% by volume of an acid component.

The above gypsum and acid medium are mixed to form a slurry, which is then subjected to a hydrothermal reaction. This hydrothermal reaction can be carried out at atmospheric pressure and a temperature at which the reaction medium is under reflux. The reaction time can be shortened by conducting the reaction under pressure. The reaction time is usually more than 2 minutes, preferably more than 10 minutes, and the reaction is carried out until the desired spherical gypsum is obtained.

After the reaction is completed, the reaction mixture is usually subjected to a solid-liquid separation while heating, and the liquid obtained is reused as a reaction medium. On the other hand, the solid material obtained by the solid-liquid separation, having a medium content (i.e., medium/solids × 100) of not more than 40%, is heat-treated. In this heat-treatment, on drying the solid material at a temperature of 50° to 80° C. for a period of 1 to 3 hours in the first place, α-type hemihydrate gypsum is obtained. Since this α-type hemihydrate gypsum is soluble in water, it becomes gypsum dihydrate in the presence of water. By applying a heat-treatment to stabilize the α-type hemihydrate gypsum, it can be converted into a soluble III type anhydrous gypsum and furthermore, into insoluble I or II type anhydrous gypsum. The stabilization of gypsum can be achieved by application of a treatment utilizing an organic polymer or others in addition to the above heat-treatment.

With the above described lightweight spherical gypsums, the crystal breakage is quite rare as compared with those in the fibrous form. Moreover, since their structure is composed of short fiber gypsums intertwined with each other, they are markedly low in bulk density and lightweight as compared with the conventional dense, spherical gypsums (as described in Japanese Patent Publication No. 23008/1969).

Binders used in the gypsum compositions of this invention are, as described above, water-soluble organic polymers, water-dispersible organic polymers, water-soluble inorganic compounds, water-dispersion medium colloid-forming inorganic compounds, water-hardenable compounds and mixtures thereof. The ratio of the binder to the lightweight spherical gypsum is not especially limited and can be appropriately determined according to the kind of the binder, the use of the gypsum composition, etc. In general, when a water-hardenable compound is used as a binder, it is blended in a ratio of 0.5 to 20,000 parts by weight, preferably 20 to 10,000 parts by weight per 100 parts by weight of the lightweight spherical gypsum. On the other hand, when the above described binders other than the water-hardenable compound are used as binders, they are blended in a ratio of 0.5 to 1,000 parts by weight, preferably 1 to 500 parts by weight per 100 parts by weight of the lightweight spherical gypsum.

Representative binders are as follows:

Preferred water-soluble organic polymers are polyvinyl alcohol, a urea-formaldehyde low polymer, a melamine-formaldehyde low polymer, methyl cellulose, carboxymethyl cellulose, an acrylamide based resin, a polyacrylic acid salt, a phenol resin prepolymer, polysaccharides (e.g., starch, sodium alginate), etc.

Water-dispersible organic polymers are classified into water-emulsifiable and water-suspensible ones. Water-emulsifiable organic polymers are, for example, polyvinyl acetate, polyvinyl chloride, a butadiene-styrene copolymer, polystyrene, a silicone polymer, an acryl resin, an acrylate polymer, a vinyl acetate-acrylonitrile copolymer, an acrylonitrile-butadiene-styrene copolymer, a styrene-acrylonitrile copolymer, wax, asphalt, etc. In this invention, these compounds are emulsified in water and used.

Water-soluble inorganic compounds and water-dispersion medium colloid-forming inorganic compounds which are preferably used in this invention, include aluminum oxide (alumina sol), water glass, aluminum diphosphate, silica (silica sol), lithium silicate, sodium silicate, potassium silicate, sulfur (sulfur sol), and the like.

Water-hardenable compounds are, for example, Portland cement, alumina cement, Portland blast furnace cement, magnesia cement and like cements, and clay, powdery gypsum, mortar, magnesium hydroxide, lime, etc.

To the compositions of this invention can be, as necessary, added fillers and others. Representative examples of the fillers which can be suitably used in this invention are fibrous materials such as fibrous gypsum, columnar gypsum, asbestos, glass fiber, synthetic fiber, pulp, rock wool, slag wool, straw, methyl cellulose and the like, perlite, glass balloon, silas balloon (glass balloon made from volcanic glass material), wood shavings, foamed polystyrene, foamed polyethylene, foamed polyurethane, pumice, silas (volcanic glass material), sand, powdery manganese, iron sand, powdery quartz, powdery glass, bentonite, calcium carbonate, zinc carbonate, aluminum hydroxide, antimony trioxide, aluminum chloride, pottery powder, mica pieces, calcium hydroxide, calcium oxide, etc.

The amount of the filler blended is not especially limited and can be determined according to the kind of the filler, the desired extent to which reinforcement is to be done, etc. In general, the filler is added in an amount of 0.5 to 2,000 parts by weight, preferably 1 to 1,000 parts by weight per 100 parts by weight of the lightweight spherical gypsum. In particular, the use of a suitable amount of fibrous material permits further reinforcement of the gypsum mold obtained.

To the compositions of this invention can be, as necessary, added a foaming agent, a shaping agent and the like. Any foaming agents which, when added together with water to the composition of this invention and mixed therewith, produce foams can be used. For example, various surface active agents can be suitably used. Suitable shaping agents include carboxymethyl cellulose, ethyleneoxide polymer, polyvinyl alcohol, hydroxypropoxymethyl cellulose, carboxymethylhydroxyethyl cellulose, glue, acrylamide-acrylic acid copolymer and the like. These shaping agents are preferably used, particularly, in combination with inorganic compound binders when they are used as binders.

For producing a gypsum molding from a gypsum composition of this invention, water is added to the gypsum composition and mixed, and the resulting mixture is molded and dried according to a commonly used procedure. A particularly preferred procedure is as follows:

Water is mixed with a lightweight spherical gypsum and a binder, and as necessary, a filler, a foaming agent, a shaping agent, etc., are added thereto and mixed. Thus a mixture in the form of lump, paste, slurry or other is obtained. In this case, the amount of water added is determined taking into account the workability, and the physical and mechanical strength of a gypsum molding. For example, where a water-hardenable compound is used as a binder, the water is added in an amount of 20 to 5,000 parts by weight per 100 parts by weight of the water-hardenable compound. On the other hand, where the above described binders other than the water-hardenable compound are used, water is added in such an amount that the viscosity reaches 0.1 to 100 centipoises (25° C.). The resulting mixture in the form of lump, paste, slurry or other is molded by procedures such as compression molding, vacuum molding, injection molding, extrusion molding, spray molding, centrifugal molding etc. It is then dried and if necessary, further calcined at high temperatures, and a gypsum molding is thus obtained.

As apparent from the above description, the use of the gypsum compositions of this invention permits the formation of lightweight moldings having an excellent mechanical strength and a specific density of not less than 0.05. According to the kind of the binder, the molding can be carried out at temperatures ranging between ordinary temperature and high temperature as high as 1,000° C. Moreover, since various molding procedures such as injection molding and others can be employed, it is possible to obtain moldings of various forms. The heat transfer coefficiency of the gypsum mold obtained is small, and its heat-insulating and heat-retaining properties are good. At the same time, it has a quite excellent heat-resistance. In addition, the brittleness of the gypsum mold is improved through the presence of the lightweight spherical gypsum, and thus its fabrication properties such as cutting, drilling, nailing and others are good.

Accordingly the gypsum compositions of this invention can be effectively used in the production of wall material, core material for laminated materials and others, fire resistant material, buffer material, heat-resistant and heat-insulating material, heat-retaining material, etc.

The following examples are given to illustrate the embodiments of this invention.

EXAMPLE 1

(1) Production of Lightweight Spherical Gypsum

To 6 liters of a 20% by volume solution of acetic acid in water was added 1.2 Kg of gypsum dihydrate, which was then mixed to prepare a slurry. This slurry was heated under reflux for 4 hours at atmospheric pressure and a temperature of 104° C. while stirring by use of a propeller type stirring blade to thereby effect the hydrothermal reaction thereof.

After the hydrothermal reaction was completed, the reaction mixture was subjected to solid-liquid separation using a centrifugal separator while it was hot, and the solvent was thus recovered and reused. The solids obtained were dried at 60° C. for 3 hours in a hot-air drying chamber to remove the attached solvent, and lightweight spherical α-type hemihydrate gypsum was thus obtained. On heating this α-type hemihydrate gypsum at 500° C. for 3 hours in an electric furnace, lightweight spherical II type anhydrous gypsum having the stable crystal structure was obtained. Microscopic observation of the lightweight spherical gypsum so obtained indicated that it was in the form of "aegagropila". In either of the α-type hemihydrate gypsum and II type anhydrous gypsum, the diameter was about 0.3 mm and the bulk density was 0.12 g/cm³. (2) To 50 g of the lightweight spherical gypsum obtained in (1) were added 70 ml of alumina sol (solid content: 10.5 g; pH: 3; produced by Nissan Chemical Industries Ltd.) and 280 ml of water, which was then mixed to prepare a suspension solution. This suspension solution was poured into a molding frame having a frame area of 10×10 cm and 40 meshes, and molded at a pressure of 0.1 to 10 Kg/cm². After removing the frame, the mold product was dried, and a plate-like molding was thus obtained.

The physical values of this molding are shown in Table 1. The bend strength was measured under the following conditions:

| Test piece | 1 × 1 × 10 (cm) |
|---|---|
| Distance between spans | 8 cm |
| Test speed | 1 mm/min |

COMPARATIVE EXAMPLE 1

The procedure of Example 1 was conducted with the exception that a fibrous gypsum (the same as used in Example 2) was used in place of the lightweight spherical gypsum.

The results obtained are shown in Table 1 in bracket.

EXAMPLES 2 TO 8

The procedure of Example 1 was repeated wherein the kind and amount of the binder, water and filler to be added to the lightweight spherical gypsum were changed. The results obtained are shown in Table 2.

EXAMPLE 9

The procedure of Example 1 was conducted wherein the lightweight spherical α-type hemihydrate gypsum obtained intermediately in Example 1 (1) was used in place of the lightweight spherical II type anhydrous gypsum. The results obtained are shown in Table 3.

EXAMPLE 10

The procedure of Example 1 was conducted wherein the lightweight spherical α-type hemihydrate gypsum (the same as used in Example 9) and polyvinyl alcohol as a binder was used. The results obtained are shown in Table 3.

EXAMPLE 11 AND COMPARATIVE EXAMPLE 2

To a predetermined amount of water were added predetermined amounts of a lightweight spherical gypsum and β-type hemihydrate gypsum, which was then mixed to prepare a suspension solution. This suspension solution was poured into a mold frame of 2×2×12.5 (cm), hardened, and then taken out of the frame and dried. A molding was thus obtained. The physical values of this molding are shown in Table 4 (Example 11). For comparison, the physical values of a molding produced by using silas balloon in place of the lightweight spherical gypsum are shown in Table 4 (Comparative Example 2).

The bend strength was measured under the following conditions:

| Test piece | 2 × 2 × 12.5 (cm) |
|---|---|
| Distance between spans | 10 cm |
| Test speed | 1 mm/min |

Table 1

| Specific Density | Bend Strength (Kg/cm²) | Specific Strength (Kg/cm²) |
|---|---|---|
| 0.35 | 18 (13) | 51 (37) |
| 0.40 | 30 (18) | 75 (45) |
| 0.53 | 50 (35) | 94 (66) |

Table 2

| Example | Amount of Lightweight Spherical Gypsum (g) | Binder | Filler (g) | Amount of Water (ml) | Specific Density | Bend Strength (Kg/cm²) | Specific Strength (Kg/cm²) |
|---|---|---|---|---|---|---|---|
| 2 | 50 | Alumina Sol (70 ml), Solid Content (10.5 g) | — | 280 | 0.55 | 51 | 93 |
|  | 40 | " | Fibrous Gypsum*²(10) | " | 0.55 | 58 | 105 |
|  | 30 | " | Fibrous Gypsum*²(20) | " | 0.55 | 56 | 102 |
|  | 5 | " | Fibrous Gypsum*²(45) | " | 0.55 | 40 | 73 |
| 3 | 50 | Polyvinyl Alcohol*⁵(10.5 g) | — | 350 | 0.31 | 22 | 71 |
| 4 | 50 | Portland Cement (20 g) | — | 350 | 0.43 | 7 | 16 |
| 5 | 50 | Styrene-butadiene Copolymer Latex*⁶(30 ml, Solid Content 14 g) | — | 320 | 0.40 | 3 | 8 |
| 6 | 50 | Alumina Sol (70 ml) Solid Content (10.5 g) | Asbestos*³(5) | 280 | 0.57 | 49 | 86 |
|  | 50 | " | Asbestos*³(10) | " | 0.65 | 64 | 98 |
|  | 50 | " | Asbestos*³(15) | " | 0.67 | 63 | 94 |
|  | 50 | " | Glass Fiber*⁴(10) | " | 0.58 | 38 | 66 |
|  | 50 | " | Glass Fiber*⁴(20) | " | 0.60 | 34 | 57 |
|  | 50 | " | Glass Fiber*⁴(30) | " | 0.67 | 33 | 49 |
| 7*¹ | 50 | Alumina Sol (70 ml) Solid Content (10.5 g) | — | 280 | 0.29 | 8 | 28 |
| 8 | 50 | Water Glass (JIS-3 100 ml) | — | 200 | 0.34 | 2 | 6 |

Table 2-continued

| Example | Amount of Lightweight Spherical Gypsum (g) | Binder | Filler (g) | Amount of Water (ml) | Specific Density | Bend Strength (Kg/cm²) | Specific Strength (Kg/cm²) |
| --- | --- | --- | --- | --- | --- | --- | --- |
| | 50 | " | Asbestos | 350 | 0.36 | 6 | 17 |

*¹As a foaming agent, 10 ml of a polyoxyethylene alkyl arylsulfonic acid based surface active agent (Foaming agent for mortar concrete Grade No. 505, produced by Nisso Master Bilders Co., Ltd.) was used.
*²Fibrous gypsum: II type anhydrous gypsum, bulk density 0.07, average length 750 μ (200 to 1200 μ), average length/diameter = 700
*³Asbestos: Long fiber fo chrysotile (produced by Nippon Asbestos Co., Ltd., Trade name 3T-700)
*⁴Glass fiber: chip length; 3 mm, treated with silane, for polyesters (produced by Asahi Fiber Glass Co., Ltd., Trade name CS-03-HB-830A)
*⁵Polyvinyl alcohol: degree of polymerization 2400, degree of saponification 98.5 mole %
*⁶Styrene-butadiene copolymer latex: Solid content 45% by weight, viscosity 25 centipoises (25° C.), (produced by Japan Synthetic Rubber Co., Ltd., Trade name JSR 0670)

Table 3

| Example | Amount of Lightweight Spherical Gypsum (g) | Binder (g) | Water (ml) | Specific Density | Bend Strength (Kg/cm²) | Specific Strength (Kg/cm²) |
| --- | --- | --- | --- | --- | --- | --- |
| 9 | 77 | β-hemihydrate Gypsum 10 | 230 | 0.49 | 16 | 33 |
| 10 | 50 | Polyvinyl alcohol*10 | 220 | 0.33 | 18 | 56 |

*the same as used in Example 3

Table 4

| Example 11 | | | | | |
| --- | --- | --- | --- | --- | --- |
| Amount of Lightweight Spherical Gypsum (g) | Binder (g) | Water (ml) | Specific Density | Bend Strength (Kg/cm²) | Specific Strength (Kg/cm²) |
| 1.0 | β-hemihydrate Gypsum 100 | 70 | 1.05 | 40 | 38 |
| 5.0 | β-hemihydrate Gypsum 100 | 70 | 1.06 | 44 | 42 |
| 5.0 | β-hemihydrate Gypsum 100 | 100 | 0.85 | 25 | 29 |
| 10.0 | β-hemihydrate Gypsum 100 | 150 | 0.66 | 9 | 14 |
| 15.0 | β-hemihydrate Gypsum 3 | 108 | 0.41 | 2 | 5 |
| 15.0 | β-hemihydrate Gypsum 15 | 120 | 0.31 | 1 | 3 |
| 10.0 | βhemihydrate Gypsum 30 | 100 | 0.44 | 1 | 2 |
| Comparative Example 2 | | | | | |
| — | β-hemihydrate Gypsum 100 | 70 | 1.05 | 33 | 31 |
| — | β-hemihydrate Gypsum 100 | 100 | 0.82 | 13 | 16 |
| — | β-hemihydrate Gypsum 100 | 150 | 0.63 | 5 | 8 |
| Silas Balloon 5.0 | β-hemihydrate Gypsum 100 | 70 | 0.93 | 26 | 28 |
| Silas Balloon 5.0 | β-hemihydrate Gypsum 100 | 100 | 0.71 | 10 | 14 |
| Silas Balloon 5.0 | β-hemihydrate Gypsum 100 | 150 | 0.56 | 4 | 7 |

It can be seen from Table 4 that silas balloon has no effect of reinforcing the molding whereas the lightweight spherical gypsum has the reinforcing effect.

What is claimed is:

1. An improved gypsum composition comprising (a) gypsum particles and (b) at least one binder for gypsum particles, the improvement comprising
said gypsum particles being light-weight spherical gypsum formed of intertwined short gypsum fibers and having a bulk density of from 0.05 to 0.5 g/cm³.

2. A gypsum composition as in claim 1, wherein said binder is in an amount of 0.5 to 1,000 parts by weight per 100 parts by weight of the lightweight spherical gypsum.

3. A gypsum composition as in claim 1, wherein said binder is in an amount of 0.5 to 20,000 parts by weight per 100 parts by weight of the lightweight spherical gypsum.

4. The composition of claim 3, wherein said binder is selected from the group consisting of Portland cement, alumina cement, Portland blast furnace cement, magnesia cement, powdery gypsum, mortar, magnesium hydroxide and lime.

5. The composition of claim 2, wherein said binder is selected from the group consisting of polyvinyl alcohol, a urea-formaldehyde low polymer, a melamine-formaldehyde low polymer, methyl cellulose, carboxymethylcellulose, an acrylamide based resin, a polyacrylic acid salt, a phenol resin prepolymer, and polysaccharides.

6. The composition of claim 2, wherein said binder is selected from the group consisting of polyvinyl acetate, polyvinyl chloride, a butadiene-styrene copolymer, polystyrene, a silicone polymer, an acryl resin, an acrylate polymer, a vinylacetateacrylonitrile copolymer, an acrylonitrile-butadiene-styrene copolymer, a styrene-acrylonitrile copolymer, wax, and asphalt.

7. The composition of claim 2, wherein said binder is selected from the group consisting of aluminum oxide (alumina sol), water glass, aluminum diphosphate, silica (silica sol), lithium silicate, sodium silicate, potassium silicate, and sulfur (sulfur sol).

8. The composition of claim 2, wherein said binder is selected from the group consisting of Portland cement, alumina cement, Portland blast furnace cement, magnesia cement, powdery gypsum, mortar, magnesium hydroxide and lime.

9. The composition of claim 1, wherein said binder is selected from the group consisting of polyvinyl alcohol, a urea-formaldehyde low polymer, a melamine-formaldehyde low polymer, methyl cellulose, carboxymethylcellulose, an acrylamide based resin, a polyacrylic acid salt, a phenol resin prepolymer, and polysaccharides.

10. The composition of claim 1, wherein said binder is selected from the group consisting of polyvinyl acetate, polyvinyl chloride, a butadiene-styrene copolymer, polystyrene, a silicone polymer, an acryl resin, an acrylate polymer, a vinylacetate-acrylonitrile copolymer, an acrylonitrile-butadiene-styrene copolymer, a styrene-acrylonitrile copolymer, wax, and asphalt.

11. The composition of claim 1, wherein said binder is selected from the group consisting of aluminum oxide (alumina sol), water glass, aluminum diphosphate, silica (silica sol), lithium silicate, sodium silicate, potassium silicate, and sulfur (sulfur sol).

12. The composition of claim 1, wherein said binder is selected from the group consisting of Portland cement, alumina cement, Portland blast furnace cement, magnesia cement, powdery gypsum, mortar, magnesium hydroxide and lime.

13. The composition of claim 2, wherein said binder is clay.

* * * * *